US009235519B2

(12) United States Patent
Lih et al.

(10) Patent No.: US 9,235,519 B2
(45) Date of Patent: Jan. 12, 2016

(54) METHOD FOR PEER TO PEER CACHE FORWARDING

(71) Applicant: Futurewei Technologies, Inc., Plano, TX (US)

(72) Inventors: Iulin Lih, San Jose, CA (US); Chenghong He, Shenzhen (CN); Hongbo Shi, Xian (CN); Naxin Zhang, Singapore (SG)

(73) Assignee: Futurewei Technologies, Inc., Plano, TX (US)

( * ) Notice: Subject to any disclaimer, the term of this patent is extended or adjusted under 35 U.S.C. 154(b) by 164 days.

(21) Appl. No.: 13/919,223

(22) Filed: Jun. 17, 2013

(65) Prior Publication Data

US 2014/0032853 A1 Jan. 30, 2014

Related U.S. Application Data

(60) Provisional application No. 61/677,289, filed on Jul. 30, 2012.

(51) Int. Cl.
*G06F 12/00* (2006.01)
*G06F 12/08* (2006.01)

(52) U.S. Cl.
CPC ........ *G06F 12/0815* (2013.01); *G06F 12/0817* (2013.01); *G06F 2212/1016* (2013.01); *G06F 2212/1024* (2013.01)

(58) Field of Classification Search
CPC ............ G06F 12/0815; G06F 12/0817; G06F 2212/1016; G06F 2212/1024

USPC ......................................................... 711/141
See application file for complete search history.

(56) References Cited

U.S. PATENT DOCUMENTS

| 6,922,756 | B2 | 7/2005 | Hum et al. | |
|---|---|---|---|---|
| 2007/0022253 | A1* | 1/2007 | Cypher et al. | 711/141 |
| 2010/0070712 | A1* | 3/2010 | Arimilli et al. | 711/122 |
| 2011/0307564 | A1* | 12/2011 | Luo et al. | 709/206 |
| 2012/0144122 | A1* | 6/2012 | Lepak et al. | 711/130 |

OTHER PUBLICATIONS

Brown, J., et al., "Proximity-Aware Directory-based Coherence for Multi-core Processor Architectures", Proceedings of the Nineteenth Annual ACM Symposium on Parallel Algorithms and Architectures, San Diego, California, Jun. 2007, 9 pages.

(Continued)

*Primary Examiner* — Aracelis Ruiz
(74) *Attorney, Agent, or Firm* — Conley Rose, P.C.; Grant Rodolph; William H. Dietrich

(57) ABSTRACT

A home node for selecting a source node using a cache coherency protocol, comprising a logic unit cluster coupled to a directory, wherein the logic unit cluster is configured to receive a request for data from a requesting cache node, determine a plurality of nodes that hold a copy of the requested data using the directory, select one of the nodes using one or more selection parameters as the source node, and transmit a message to the source node to determine whether the source node stores a copy of the requested data, wherein the source node forwards the requested data to the requesting cache node when the requested data is found within the source node, and wherein some of the nodes are marked as a Shared state corresponding to the cache coherency protocol.

20 Claims, 5 Drawing Sheets

(56) References Cited

OTHER PUBLICATIONS

Foreign Communication From a Related Counterpart Application, PCT Application PCT/US2013/052754, International Search Report, dated Nov. 28, 2013, 3 pages.

Foreign Communication From a Related Counterpart Application, PCT Application PCT/US2013/052754, Written Opinion, dated Nov. 28, 2013, 7 pages.

* cited by examiner

METHOD FOR PEER TO PEER CACHE FORWARDING

CROSS-REFERENCE TO RELATED APPLICATIONS

The present application claims priority to U.S. Provisional Patent Application No. 61/677,289 filed Jul. 30, 2012 by Yolin Lih, et al. and entitled "Method for Peer to Peer Cache Forwarding," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multi-core (e.g. multi-processor) systems may comprise a plurality of cache nodes used to store data, such as processing instructions and frequently referenced data in main memory locations and/or other cache levels. One or more copies of data (e.g. a cache line) that references a particular main memory location may be stored within different locations in the multi-core system. For example, a data value of "0" associated with main memory address "0" may be stored in each of the cache nodes within the multi-core systems. When one copy of the data is modified in one of the cache nodes, a cache coherence mechanism may modify other copies located in other cache nodes. The cache coherence mechanism may maintain the consistency of data stored within many different cache nodes by propagating changes in the data throughout the multi-core system.

Two types of cache coherence mechanisms that may be used within a multi-core system are snooping-based coherence and directory-based coherence. In snooping-based coherence, requests to modify data (e.g. a write instruction) may be broadcast by each of the cache nodes. Other cache nodes may monitor the requests sent out and determine whether the received requests correspond to data stored within their own cache memory. Although snooping-based coherence may have short latency periods, the systems that implement snooping-based coherence may suffer from bandwidth and scalability problems caused by constant broadcast of data. Alternatively, in directory-based coherence, data that is being shared amongst one or more cache nodes may be stored in a home node. The home node may maintain the coherence between cache nodes within a multi-core system using a directory. When data is changed in one cache node, the home node may update or invalidate entries in other cache nodes that store the data. Cache nodes may also send a request for permission to the home node prior to loading data from the main memory. As a result, in comparison to snooping-based coherence, directory-based coherence improves scalability and bandwidth concerns, but suffers from longer latencies caused by the constant access of the home node.

To reduce latency within directory-based coherence, cache coherency protocols, such as Modified Owned Exclusive Shared Invalid (MOESI) protocol or Modified Exclusive Shared Invalid Forward (MESIF) protocol may be used to implement peer-to-peer cache forwarding. Peer-to-peer cache forwarding occurs when one of the cache nodes is used to forward the requested data to another cache node. Instead of the home node receiving the requested data from the designated cache node and subsequently responding to the request, the designated cache node directly responds to the request. In the MOESI protocol, the cache node designated to hold the data and respond to request for the data may be designated with an "Owned" state, while the MESIF protocol may use a "forward" state to designate the cache node. In both MOESI and MESIF protocols, the designated cache nodes are responsible for responding to requests from other cache nodes for a particular data (e.g. cache line).

Unfortunately, the MOESI and MESIF protocols lack flexibility in selecting cache nodes designated to respond to request from other cache nodes. For instance, the MESIF protocol designates the cache node that requested the data most recently with the "forward" state. For the MOESI protocol, the "Owned" state is designated for the cache node that stores the more recent, correct copy of the data. Therefore, both the MOESI and MESIF protocols do not dynamically select cache nodes based on performance factors, such as location of the requesting cache node and the current workload being processed at the designated cache node. Hence, in some instances, the designated cache node may become a processing bottleneck and cause performance degradation within a multi-core system. Therefore, a solution is needed to dynamically select a cache node to satisfy requests within the multi-core system.

SUMMARY

In one embodiment, the disclosure includes a home node for selecting a source node using a cache coherency protocol, comprising a logic unit cluster coupled to a directory, wherein the logic unit cluster is configured to receive a request for data from a requesting cache node, determine a plurality of nodes that hold a copy of the requested data using the directory, select one of the nodes using one or more selection parameters as the source node, and transmit a message to the source node to determine whether the source node stores a copy of the requested data, wherein the source node forwards the requested data to the requesting cache node when the requested data is found within the source node, and wherein some of the nodes are marked as a Shared state corresponding to the cache coherency protocol.

In yet another embodiment, the disclosure includes a cache node for performing peer-to-peer cache forwarding using a cache coherency protocol, comprising a logic unit cluster coupled to a local memory, wherein the logic unit cluster is configured to receive a snoop forward message from a home node, determine whether a requested data is stored within the local memory using information from the snoop forward message, forward the requested data to a requesting cache node when the requested data is stored within the local memory, and transmit a message to the home node when the requested data is not stored within the local memory, wherein the cache node is assigned a Shared state of the cache coherency protocol.

In yet another embodiment, the disclosure includes a method for selecting a source node using a cache coherency protocol, wherein the method comprises maintaining a directory that marks a plurality of entries as a Shared state within the cache coherency protocol, receiving a data request from one of the cache nodes, determining whether the data requested maps to one of the entries within the directory, transmitting the data request to the next level of memory when the data requested is not found in one of the entries within the directory, selecting a source node from a plurality of cache nodes that correspond to the one of the entries when the data requested is found in the one of the entries using one or more selection parameters, transmitting a forward snoop message to the source node to determine whether the source node stores a copy of the requested data, wherein the selection parameters prioritize which cache node is selected as the source node, and wherein the source node has a highest priority amongst the cache node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein are at least one method, apparatus, and system to dynamically select a source node to satisfy a request from a requesting cache node for a multi-core system. A home node may dynamically specify a source node (e.g. cache node and/or home node) to forward data for the requesting cache node based on the condition status of the source node and topology of the multi-core system. The home node may select a source node without using an "Owned" state and/or "Forward" state found in the MOESI and MESIF protocols, respectively. When a requesting cache node is unable to locate specific data within its local cache memory (e.g. a cache miss), the requesting cache node may transmit a request to the home node to obtain the specific data. Once a home node receives the request for data from the requesting cache node, the home node may dynamically select a source node that shares the requested data with other cache nodes (e.g. in a "Shared" state) based on a variety of selection factors, such as the current condition status of the source node, topology of the multi-core system, and/or selection preferences, to satisfy the request. The home node may forward a message (e.g. a snoop forward message) to the source node instructing the source node to forward the data to the requesting cache node. After the source node receives instructions from the home node, the source node may forward the data to the requesting cache node if the data is located within the source node.

Figure 1:
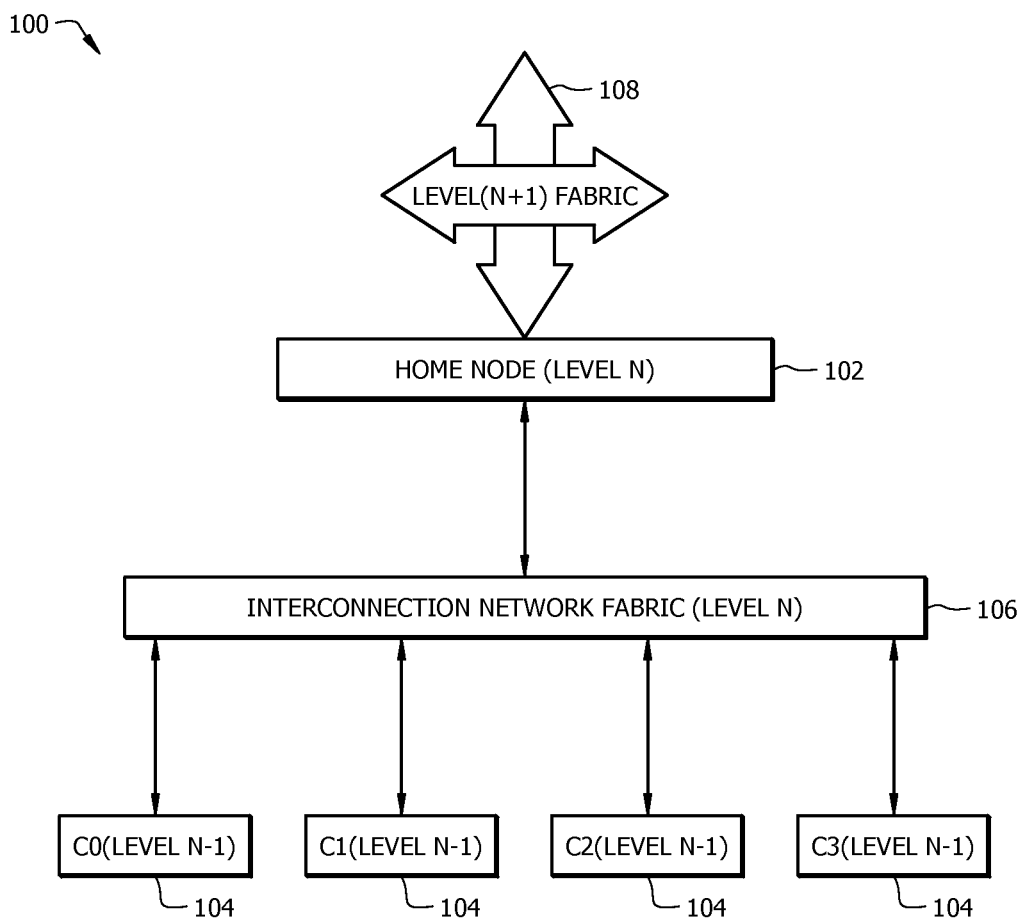
FIG. 1 is a schematic diagram of an embodiment of a multi-core system with a fractal structure for memory.

FIG. 1 is a schematic diagram of an embodiment of a multi-core system 100 with a fractal structure for memory. The multi-core system 100 may comprise multiple levels of memory to form a memory hierarchy. As shown in FIG. 1, the multi-core system 100 may comprise a home node 102, an interconnection network fabric 106, and one or more cache nodes 104. The home node 102 may be physically and/or logically centralized within the multi-core system 100 to manage the cache coherency among cache nodes 104. In one embodiment, home node 102 may be located at level N of the memory hierarchy for the multi-core system 100, while cache nodes C0-C3 104 may be located one level lower in the memory hierarchy (e.g. level N−1) than home node 102. For example, cache nodes C0-C3 104 may be a level 2 cache (e.g. level 2 of the memory hierarchy), while home node 102 may be a level 3 cache (e.g. level 3 of the memory hierarchy). Home node 102 may communicate with cache nodes C0-C3 104 via the interconnection network fabric 106, which may be located at the same level of the memory hierarchy as home node 102 (e.g. level N). Additionally, home node 102 may communicate with higher levels of the memory hierarchy (level N+1) via the Level (N+1) fabric 108. Other embodiments of the multi-core system 100 may have the home node 102 track cache nodes 104 that are located more than one level down the memory hierarchy than home node 102 (e.g. level N−2). In one example, home node 102 may be a level 5 cache, while cache nodes C0-C3 104 may be a level 3 cache or lower. When the cache node 104 is more than one memory level below the home node 102, the home node 102 may need more resources (e.g. memory space) to manage the additional levels of memory, and thereby increase the cost of implementing home node 102.

In one embodiment, home node 102 may be associated with the main memory level of the memory hierarchy for the multi-core system 100. The home node 102 may comprise main memory, such as dynamic random access memory (DRAM) to store a copy of the data. In other words, the home node 102 may be configured to store un-cached copies of data. Home node 102 may also comprise one or more cache memories that may be used to store a copy of the data at one of the levels of cache within the home node 102. As discussed above, other embodiments of home node 102 may be implemented at lower levels of the memory hierarchy for the multi-core system 100, such as at the level 3 cache.

The home node 102 may be any node configured to maintain cache coherency between cache nodes C0-C3 104. The home node 102 may maintain cache coherency by monitoring the states of the cache nodes C0-C3 104 for cache lines located within each cache node C0-C3 104. The home node 102 may comprise a directory configured to monitor the states of cache nodes 104 for data stored in a cache line. The directory may track the cache lines stored in the cache node and associate the cache lines with a cache state. For example, the directory may associate one cache line within cache node C0 104 with a "Shared" cache state, while another cache line within cache node C0 104 may have an "Invalid" cache state. The directory may track the states of the cache nodes C0-C3 104 using directory entries encoded using a variety of protocols that include, but are not limited to the bit-vector protocol and coarse-vector protocol. Each directory entry within the directory may comprise state bits used to represent the different cache states, such as whether the cache line is dirty (e.g. "Modified" state). In one embodiment, the directory may be stored within the main memory of the home node 102. Cache states for cache nodes 104 will be discussed in further detail below.

Each of the cache nodes C0-C3 104 may comprise cache memory used to store data within cache lines. The cache lines within each of the cache nodes C0-C3 104 may be assigned different states depending on the cache coherency protocol. In one embodiment, multi-core system 100 may be configured to implement the Modified Exclusive Share Invalid (MESI) protocol to maintain cache coherency. For the MESI protocol, each of the cache lines within a cache node 104 may be marked as a "Modified" state, an "Exclusive" state, a "Shared" state, or an "Invalid" state. A cache line that is marked with a "Modified" state may indicate that the cache line is "dirty" in that data is present only within the cache line. The data value of the cache line may have been modified and may be different from the value stored within the home node 102 and/or main memory. An "Exclusive" state may indicate the cache line within the cache node 104 holds or stores the most recent data and is present in the cache node 104 and no other cache nodes 104. The "Exclusive" state may also indicate the cache line is "clean," which represents that the data stored within the cache line matches the data stored within the home node 102 and/or main memory. A "Shared" state indicates that the cache line may be stored in other cache nodes 104. In one embodiment, the "Shared" state may indicate the cache line is "clean." An "Invalid" state indicates that the cache line is invalid and does not hold a valid copy of data within the cache line. The cache line may be unused and may be available to store new data. Valid copies of data may be in the home node 102, other cache nodes 104, and/or other memory levels of memory hierarchy (e.g. main memory).

The directory within the home node 102 may encode two bits within each of the directory entries to represent the different states for the Modified Exclusive Share Invalid MESI protocol. For example, "00" may be encoded to represent the "Modified" state; "01" may be encoded to represent the "Exclusive" state; "10" may be encoded to represent the "Shared" state; and "11" may be encoded to represent the "Invalid" state. In comparison to the MESI protocol, both the MOESI and MESIF protocols may use three bits to encode the different states for a cache line. An additional bit may be used to represent the "Owned" state and the "Forward" state for the MOESI and MESIF protocols, respectively. However, the additional bit for the MOESI and MESIF protocol may increase the cost of managing cache coherency within the multi-core system 100. Thus, by using the MESI protocol, the directory does not need a third bit to encode the different states because the home node 102 may select a source node without using an "Owned" state and/or "Forward" state as required in MOESI and MESIF protocols, respectively. Other embodiments of the multi-core system 100 may implement cache coherency protocols that have less than four states, such as the Modified Share Invalid (MSI) protocol.

The home node 102 may also be configured to dynamically select a source node to satisfy a request from one of the cache nodes C0-C3 104, and thus differs from the MOESI and MESIF protocol, where the source node may be pre-designated. Typically, the MOESI protocol designates the source node with the "Owned" state, meaning the source node stores the more recent, correct copy of the data. The MESIF protocol typically designates the source node with the "Forward" state, meaning the source node is the cache node that requested the data most recently. However, the MOESI and MESIF protocols do not account for efficiency factors, such as distance of the source node to the requesting cache node and current workload of the source node.

To improve flexibility and performance, the home node 102 may dynamically select the source node based on a variety of selection parameters that include, but are not limited to topology of the multi-core system 100, the current condition status of cache nodes 104 and home node 102, and/or preferences on the selection process. The selection parameters may prioritize and/or list in order the cache nodes 104 and/or home node 102 that are selected as the source node. The selection parameters may be stored within main memory and/or the directory. The "topology selection parameters" may include parameters that pertain to the layout of the multi-core system 100, such as the distance between each of the cache nodes C0-C3 104 and home node 102, and the topological layout of the multi-core system 100 to select the source node. The "current condition status" selection parameters may pertain to different conditions associated with the cache nodes C0-C3 104, such as the age of data stored within a cache line, the current workload and traffic load of the cache nodes C0-C3 104, and available bandwidth and/or capacity of the cache nodes C0-C3 104. The "preference selection parameter" may represent predefined methods to select a source node, such as using a random or a round robin method in selecting the source node. The selection parameters will be discussed in more detail in FIG. 4. No state designation (e.g. "Owned" or "Forward") may be used to determine the source node.

The interconnection network fabric 106 may be any type of data path used to route data between each of the cache nodes C0-C3 104 and home node 102. For example, cache node C0 104 may send a request for data via the interconnection network fabric 106 to reach home node 102. Moreover, in a peer-to-peer cache forwarding, cache node C1 104 may forward data requested by cache node C0 104 to cache node C0 104 via the interconnection network fabric 106. In one embodiment, the interconnection network fabric 106 may be a shared bus that interconnects the cache nodes C0-C3 104 and home node 102 in a linear topology. Other embodiments of the interconnection network fabric 106 may interconnect the cache nodes C0-C3 104 in a variety of other topologies, such as a ring topology or mesh topology. The Level (N+1) fabric 108 may be substantially similar to the interconnection network fabric 106 except that the Level (N+1) fabric 108 may be used to interconnect home node 102 to other nodes located within the next level of the memory hierarchy.

Figure 2:
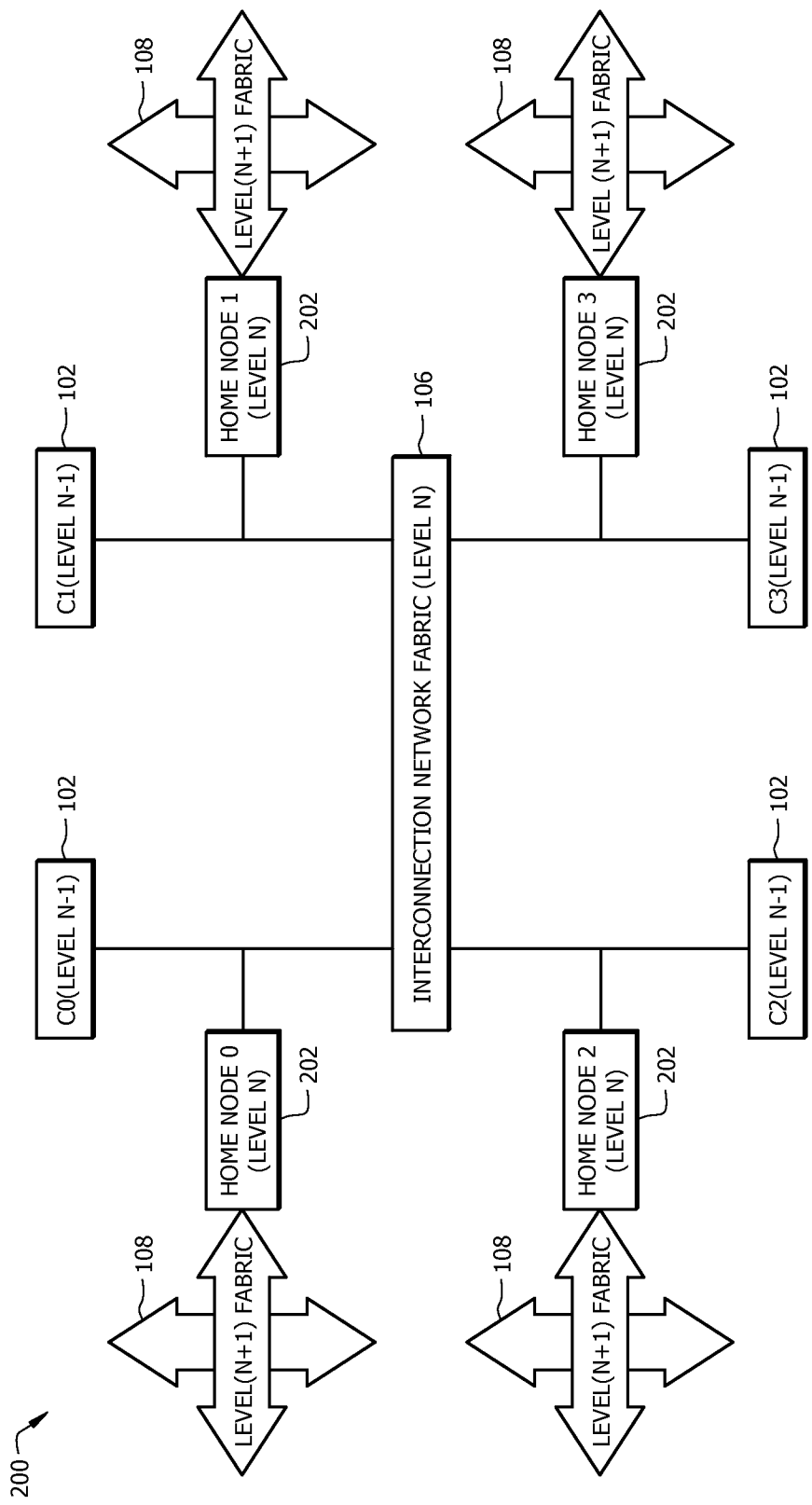
FIG. 2 is a schematic diagram of another embodiment of a multi-core system with a fractal structure for memory.

FIG. 2 is a schematic diagram of another embodiment of a multi-core system 200 with a fractal structure for memory. FIG. 2 illustrates that home nodes 0-3 202 may be distributed amongst the multi-core system 200. Distributed home nodes 0-3 202 may be used when the multi-core system 200 is very large and complex. Each of the cache nodes C0-C3 102 may be associated with one of the home nodes 0-3 202. The home nodes 0-3 202 may each maintain a portion of the memory located at level N of the memory hierarchy. The memory within the home nodes 0-3 202 may reference different address ranges for the level N memory. For example, level N may be a level 5 memory (e.g. main memory) of the multi-core system 200 that has a total memory size of about 32 gigabytes. The 32 gigabytes of memory may be partitioned amongst the home nodes 0-3 202 such that each of the home nodes 0-3 202 may have a memory size of about eight gigabytes. Home node 0 202 may hold the address range for the first eight gigabytes of the level 5 memory; home node 1 202 may hold the address range for the second eight gigabytes of the level 5 memory; home node 2 202 may hold the address range for the third eight gigabytes of the level 5 memory; and home node 3 202 may hold the address range for the fourth eight gigabytes of the level 5 memory. Cache nodes C0-C3 102 may be configured to include within their level 4 memory (e.g. level 4 cache) any of the data stored within the 32 gigabyte range of the level 5 memory.

Figure 3:
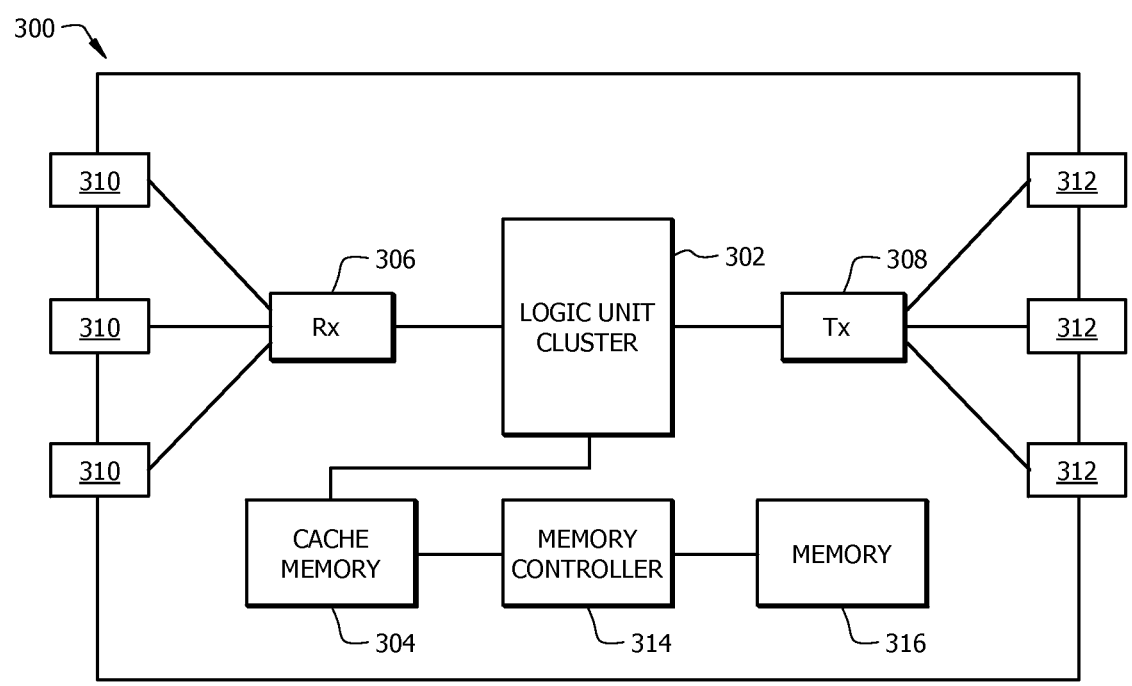
FIG. 3 is a schematic diagram of a node suitable for implementing one or more embodiments of the nodes disclosed within the multi-core system.

FIG. 3 is a schematic diagram of a node 300 suitable for implementing one or more embodiments of the nodes disclosed within the multi-core system, such as the cache node 104 and home node 102 shown in FIGS. 1 and 2. Node 300 may comprise one or more ingress ports or network interfaces 310 and one or more egress ports or network interfaces 312. The ingress ports or network interfaces 310 and egress ports or network interfaces 312 may be physical and/or logical ports used to connect to the interconnection network fabric 106 and/or Level (N+1) fabric 108 as shown in FIG. 1. The ingress ports or network interfaces 310 may be internally coupled to a receiver (Rx) 306 for receiving data from other nodes, while the egress ports or network interfaces 312 may be coupled to a transmitter (Tx) 308 for transmitting data to other nodes.

The node 300 may also comprise a logic unit cluster 302 coupled to the Rx 306 and the Tx 308, where the logic unit cluster 302 may be configured to implement instructions that request data from other nodes, use selection parameters to determine the source node, and/or forward data to request nodes. The logic unit cluster 302 may also be configured to implement method 500, which will be described in more detail later. The logic unit cluster 302 may comprise one or more central processing unit (CPU) chips, field-programmable gate arrays (FPGAs), application specific integrated circuits (ASICs), digital signal processors (DSPs), and/or may be part of one or more ASICs and/or multi-processor clusters. The logic unit cluster 302 may be configured to write and/or read data from cache memory 304 and memory 316, and generate requests to peer nodes to obtain data when the data is not located within cache memory 304 and memory 316.

FIG. 3 illustrates that the logic unit cluster 302 may be physically and/or logically coupled to a cache memory 304. Cache memory 304 may be volatile and/or non-volatile memory and may be implemented using random access memory (RAM), flash memory, disk drives, and/or any other suitable type of memory. Cache memory 304 may be used to store volatile data and instructions for logic unit cluster 302 and/or store copies of data from frequently-accessed memory locations within memory 316. In one embodiment, cache memory 304 may comprise more than one level of cache. For example, cache memory 304 may comprise a level one cache, a level two cache, and a level three cache. One or more levels of cache within cache memory 304 may be embedded into one or more of the processors within logic unit cluster 302, while other levels of cache within cache memory 304 may be located externally to logic unit cluster 302. Other embodiments of cache memory 304 may have all the levels of cache within cache memory 304 embedded within the logic unit cluster 302 or have all the levels of cache within cache memory 304 external to logic unit cluster 302.

The cache memory 304 may also be coupled to memory controller 314 that manages the flow of incoming and outgoing data for memory 316. In one embodiment, the memory controller 314 may be external to the logic unit cluster 302, while another embodiment may have the memory controller 314 embedded within the logic unit cluster 302. The memory controller 314 may also be configured to maintain cache coherency between memory 316 and cache memory 304. Generally, memory 316 may be implemented using volatile memory, such as RAM memory (e.g. DRAM). Another embodiment of memory 316 may comprise non-volatile memory, such as one or more disks, tape drives, optical disc drives, or solid-state drives that may be used for non-volatile storage of data and as an over-flow data storage component. Memory 316 may store programs when such programs are selected for execution and may store instructions and perhaps data that are read during program execution. Typically, memory 316 may be capable of storing more data than the cache memory 304 and may be slower to access than cache memory 304. Cache memory 304 and memory 316 may represent the local memory within node 300. Some embodiments of node 300 may not include a memory 316 and/or memory controller 314.

Figure 4:
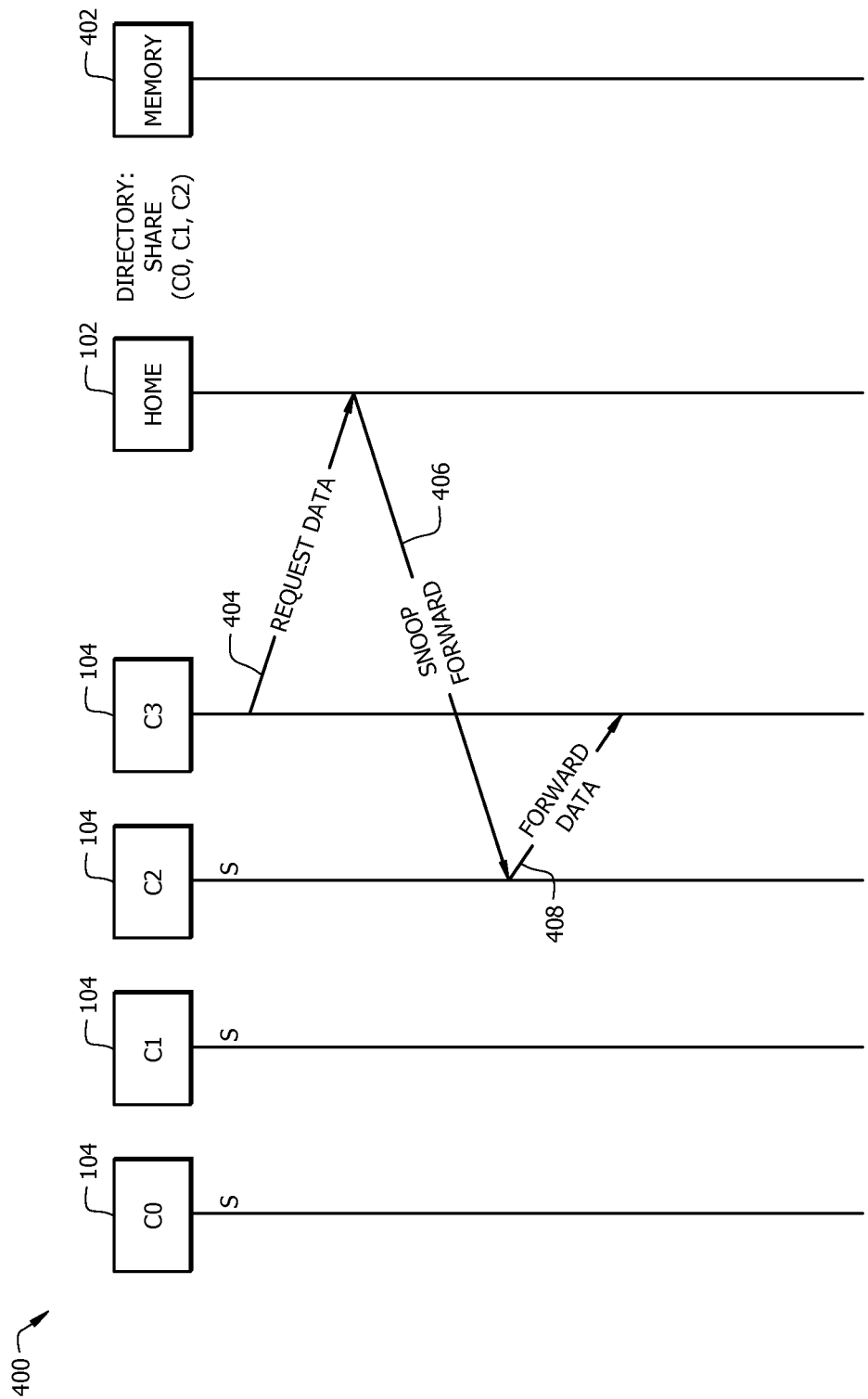
FIG. 4 is a message sequence diagram of a multi-core system for implementing peer-to-peer cache forwarding.

FIG. 4 is a message sequence diagram of a multi-core system 400 for implementing peer-to-peer cache forwarding. The multi-core system 400 may comprise cache nodes C0-C3 104, a home node 102, and memory 402. Memory 402 may be the main memory for the multi-core system 400. Home node 102 may be further configured to perform memory controller functions as described in FIG. 3. Home node 102 and memory 402 may be located at level N of the memory hierarchy, while cached nodes 104 may be located at level N−1 of the memory hierarchy. As shown in FIG. 4, cache node C3 104 may act as a request node by sending a request data message 404 to home node 102. The request message 404 may be a read or a write request for data located within a specific address of memory 402. Request message 404 may be generated within cache node C3 104 when a local miss occurs within the local memory of cache node C3 104. In other words, the request message 404 may indicate cache node C3's 104 desires to obtain requested data from a source node, which may be one of the cache nodes C0-C2 104 and/or memory 402, because cache node C3 104 is unable to find the requested data within its local memory. Recall that the logic unit cluster 302 within FIG. 3 may comprise processors that may generate the request for data.

When home node 102 receives the request message 404 from the request node (e.g. cache node C3 104), home node 102 may map the requested data to one of the directory entries within the directory. Information within the directory may be used to determine which cache nodes C0-C2 104 may already store the requested data and the state of the cache lines that store the requested data. In FIG. 4, the directory within home node 102 indicates that cache nodes C0-C2 104 are marked "Shared" states for the cache lines that correspond to the requested data. Persons of ordinary skill in the art are aware that cache nodes C0-C2 104 may have different cache states depending on the data requested by cache node C3 104. For example, cache node C3 104 may send a request data message 404 to home node 102 to request data from address "0" of memory 402. For this request, cache nodes C0-C2 104 may have "Shared" states associated with cache lines corresponding to address "0." Cache node C3 104 may send a subsequent request data message 404 to home node 102 to request data from address "1" of memory 402. In this instance, cache node C0-C1 104 may have "Shared" states, while cache node C2 104 may have "Invalid" state for the requested data.

After determining which cache nodes C0-C2 104 are marked a "Shared" state, the home node 102 may dynamically select one of the cache nodes C0-C2 104 that is marked as a "Shared" state as the source node. In one embodiment, home node 102 may also select itself as the source node instead of one of the cache nodes C0-C2 104 that are marked with the "Shared" state. Home node 102 may select the source node based on one or more selection parameters for each received request message 404. The selection parameters may prioritize and/or determine the order (e.g. priority list) of the cache nodes 104 and/or home node 102 that are selected as the source node. For example, cache node C2 104 may have the highest priority or be listed as number one in a list for being the first node to be selected as the source node. Cache node C1 104 may have the next highest priority or be listed as number two, while cache node C0 104 may have lower priority than cache node C1 104 or be listed as number three. Home node 102 may be designated with the lowest priority and listed as number four of the priority list. By prioritizing which cache node 104 is selected as the source node, the selection parameters may reduce the overall processing time to satisfy cache node C3's 104 request. Although FIG. 4 illustrates that the selected source node may be in a "Shared" state, other embodiments may have the selected source node (e.g. cache node C2 104) in a "Modified" state and/or a "Exclusive" state. In other words, peer-to-peer cache forwarding may also occur when the selected source node is in a "Modified" state and/or an "Exclusive" state.

As discussed above, the selection parameters may include parameters based on the topology of the multi-core system 400, the current condition status of the cache nodes 104 and home node 102 within the multi-core system 400 and any preferences for the selection process. One or more of the different selection parameters may be combined to optimize the selection process for selecting a source node. For example, home node 102 may select a source node based on one of the "topology selection parameters" and one of the "current condition status" selection parameters. The selection parameters may be stored within main memory and/or the directory. Home node 102 may dynamically select a cache node 104 and/or itself as the source node each time home node 102 receives a request from a requesting cache node 104. The selection of the source node is not pre-defined and/or pre-determined by a cache coherency protocol.

The "topology selection parameters" may include parameters that pertain to the topology of the multi-core system 400. The "topology selection parameters" may vary in the granularity of detail in regards to the topology of the multi-core system 400. For example, home node 102 may store broad "topology selection parameters" and/or not detailed topology information, such as a distance value of the cache nodes 104 and home node 102 relative to the cache node 104 that sent the request data message 404. Based on the distance information, home node 102 may select the cache node 104 that has the closest proximity to the cache node 104 that sent request data message 404. Using FIG. 4 as an example, home node 102 may select cache node C2 104 as the source node because cache node C2 104 may be the closest cache node 104 located to cache node C3 104. In another embodiment, home node 102 may use the topological layout (e.g. mesh topology) of the multi-core system 400 to select a source node. For example, multi-core system 400 may use cost maps that provide cost information to forward data from one cache node 104 to another cache node 104 using the different paths within multi-core system 400.

The "current condition status" selection parameters may pertain to different conditions associated with the cache nodes C0-C2 104, such as the age of data stored within a cache line. A home node 102 may use the age of the data stored in cache nodes C0-C2 104. The age of the data may represent the time interval that has elapsed since storing a copy of the data within a cache node 104 and notifying the home node 102. In some instances, although a directory entry may have cache lines in cache nodes C0-C2 104 marked as a "Shared" state, the actual cache lines within cache nodes C0-C2 104 may have been overwritten with new data without notifying the home node 102. Selecting cache nodes 104 that recently stored the requested data within a cache line increases the likelihood that the cache nodes 104 still hold the correct data. Using FIG. 4 as an example, cache node C0 104 may have held the requested data for the longest time period (e.g. age of the data is the oldest of cache nodes C0-C2 104), while cache node C2 104 may have held the requested data for the shortest time period. In some instances, cache node C0 104 may have dropped the requested data and overwritten the cache line with new data. If home node 102 selects cache node C0 104 as a source node, then cache node C0 104 would be unable to perform peer-to-peer cache forwarding. Thus, a home node 102 may select the cache node 104 with the most recent copy of the requested data. The "current condition status" selection parameters may also include parameters such as the current workload, available bandwidth and capacity of each of the cache nodes 104 and home node 102. Home node 102 may monitor the current work load, available bandwidth, and the processing capacity of each of the cache nodes 104 and itself. Home node 102 may dynamically select a cache node 104 and/or home node 102 that has the most available bandwidth and/or the least current work load as the source node.

The home node 102 may be configured to select source nodes using "preference selection parameters." The "preference selection parameter" may represent predefined methods to select a source node. For example, the home node 102 may be configured to select a source node at random and/or in a round robin fashion. Selecting source nodes at random may be used when resources and processing capacity within multi-core system 400 are abundant. Random and/or round robin selection processes are typically less complex to implement, and thus may reduce the processing time a home node 102 may need to select a source node.

After selecting the source node, home node 102 may subsequently send a snoop forward message 406 to the source node. The snoop forward message 406 may be used to determine whether the source node has the data requested in the request data message 404 and instructs the source node to forward the requested data to the requesting cache node 104. After receiving the request, the source node may perform a lookup using the address referenced in the request data message 404. When the source node has the requested data at that address, then the source node may forward the requested data to the requesting cache node 104. As shown in FIG. 4, as the source node, cache node C2 104 forwards the forward data message 408 to cache node C3 104. In one embodiment, the home node 102 may also be able to select itself to forward the data to cache node C3 104 if the selection parameters used by home node 102 select home node 102 as the source node. When the home node 102 designates itself as the source node, the home node 102 does not need to transmit a snoop forward message 406. Instead, the home node 102 may transmit the forward data message 408 directly to cache node C3 104, without first transmitting the snoop forward message 406.

Alternatively, if the selected source node (e.g. cache node C2 104) does not store the data requested in the request data message 404, then the selected source node may respond to the snoop forward message 406 by transmitting a message to home node 102, which is not shown in FIG. 4, indicating the requested data is not found. In instances where the directory within the home node 102 indicates that the selected source node is in the "Modified" and/or "Exclusive" state, the selected source node may also provide an indication within the reply message on whether a write-back instruction is on its way to the home node 102. Including a write-back indication may prevent potential deadlock issues and unnecessary traffic overhead, which is discussed in more detail in U.S. patent application Ser. No. 13/900,187 filed May 22, 2013 by Tulin Lih, et al. and entitled "Handling Cache Write-back and Cache Eviction for Cache Coherence," which is incorporated herein by reference as if reproduced in its entirety. Home node 102 may subsequently wait for the write-back before transmitting forward data message 408 to cache node C3 104 (e.g. request node).

Figure 5:
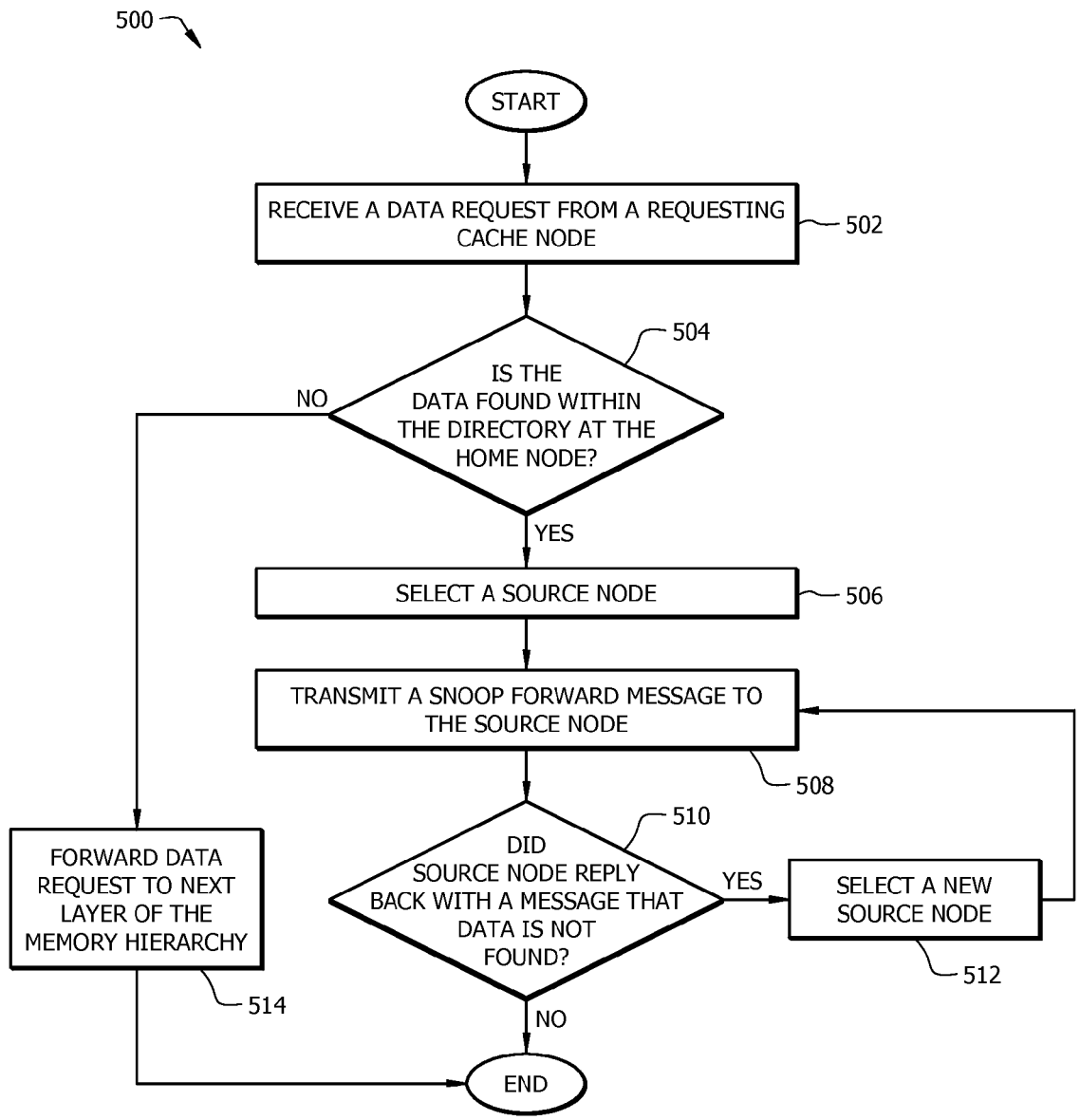
FIG. 5 is a flowchart of an embodiment of a method that dynamically selects a source node based on one or more selection parameters.

FIG. 5 is a flowchart of an embodiment of a method 500 that dynamically selects a source node based on one or more selection parameters. Method 500 may be performed by the home node 102 and may be used when the requested data is "clean" data (e.g. data already stored in main memory). As discussed above, the selection parameters may be stored within the memory and/or directory of the home node 102. Method 500 starts at block 502 and receives a data request from a requesting cache node. The requesting cache node may be unable to obtain the data locally within the requesting cache node and subsequently send the data request asking the home node where to obtain the requested data.

After receiving the request, method 500 may proceed to block 504 and determine whether the data is found within the directory at the home node. If the directory does not have the information, method may proceed to block 514 to forward the data request to the next layer of the memory hierarchy. As shown in FIGS. 1 and 2, the data request may forward the data request via the network fabric located at the next level of the memory hierarchy. Afterwards, completing block 514, method 500 then ends. Returning back to block 504, if method 500 finds the requested data within the directory, then method 500 proceeds to block 506.

At block 506, method 500 may select a source node based on one or more of the selection parameters discussed above. A source node may be one of the cache nodes other than the cache node requesting the data and/or a home node. The selection of the source node is not pre-defined and/or pre-determined by a cache coherency protocol, such as using a "Owned" state and/or a "Forward" state to mark the source node. After method 500 selects a source node, method 500 may proceed to block 508 and transmit a snoop forward message to the source node. Afterwards method 500 moves to block 510 and determines whether the source node replies back with a message that indicates no data is found. If method 500 subsequently receives a message that indicates no data is found, method 500 continues to block 512 and selects a new source node. After block 512, method 500 loops back to block 508. Returning back to block 510, if method 500 does not receive a message from the source node that indicates the requested data is not found, then method 500 ends.

It is understood that by programming and/or loading executable instructions onto node 300, at least one of the logic unit cluster 302, the cache memory 304, memory controller 314, and memory 316 are changed, transforming node 300 in part into a particular machine or apparatus, e.g., a node, having the novel functionality taught by the present disclosure. It is fundamental to the electrical engineering and software engineering arts that functionality can be implemented by loading executable software into a computer, which can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A home node for selecting a source node using a cache coherency protocol, comprising:
    a logic unit cluster coupled to a directory, wherein the logic unit cluster is configured to:
        receive a request for data from a requesting cache node;
        determine a state of a plurality of nodes that may hold a copy of the requested data using the directory;
        select one of the nodes using two or more selection parameters as the source node, wherein the two or more selection parameters are used simultaneously in combination; and
        transmit a message to the source node to determine whether the source node stores a copy of the requested data,
        wherein the source node forwards the requested data to the requesting cache node when the requested data is found within the source node, and some of the nodes are marked as a Shared state corresponding to the cache coherency protocol and satisfy the two or more selection parameters.

2. The home node of claim 1, wherein the logic unit cluster is further configured to receive a second message from the source node when the requested data is not found within the source node.

3. The home node of claim 2, wherein the logic unit cluster is further configured to select a second source node using one or more selection parameters when receiving the second message.

4. The home node of claim 2, wherein the cache coherency protocol is a Modified, Exclusive, Shared, Invalid (MESI) cache coherency protocol.

5. The home node of claim 1, wherein the directory comprises a plurality of state information that corresponds to the cache coherency protocol for a plurality of cache lines located within at least some of the nodes.

6. The home node of claim 1, wherein the selection parameters comprise at least two of the following parameters: a topology selection parameter, a current condition status selection parameter, and a preference selection parameter.

7. The home node of claim 6, wherein the topology selection parameter represents the distance between the requesting cache node and the nodes.

8. The home node of claim 6, wherein the current condition status selection parameter represents a plurality of ages for the requested data stored in the nodes.

9. The home node of claim 6, wherein the preference selection parameter represents a random selection process to select the source node.

10. The home node of claim 1, wherein one of the nodes is the home node, and wherein the home node is at a higher memory level than the other nodes.

11. The home node of claim 1, wherein the logic unit cluster is further configured to receive a second request from the requesting cache node and select a second source node to forward the second request data to the requesting cache node, and wherein the source node and second source node are different nodes.

12. A cache node for performing peer-to-peer cache forwarding using a cache coherency protocol, comprising:
    a logic unit cluster coupled to a local memory, wherein the logic unit cluster is configured to:
    receive a snoop forward message from a home node;
    determine whether a requested data is stored within the local memory using information from the snoop forward message;
    forward the requested data to a requesting cache node when the requested data is stored within the local memory; and
    transmit a message to the home node when the requested data is not stored within the local memory,
    wherein the cache node is assigned a Shared state of the cache coherency protocol, and the cache node satisfied two or more selection parameters prior to receiving the snoop forward message, and the two or more selection parameters are used simultaneously in combination.

13. The cache node of claim 12, wherein a copy of the requested data is stored in the home node.

14. The cache node of claim 12, wherein the cache node coupled to a plurality of nodes, and wherein the cache node has less traffic workload than the nodes.

15. The cache node of claim 12, wherein the cache coherency protocol uses two bits to represent the Shared state for the cache node.

16. The cache node of claim 12, wherein the cache coherency protocol is a Modified, Share, Invalid (MSI) cache coherency protocol.

17. A method for selecting a source node using a cache coherency protocol, wherein the method comprises:
    maintaining a directory that marks a plurality of entries as a Shared state within the cache coherency protocol;
    receiving a data request from one of the cache nodes;
    determining whether the data requested maps to one of the entries within the directory;
    transmitting the data request to a next level of memory when the data requested is not found in one of the entries within the directory;
    selecting a source node from a plurality of cache nodes that correspond to the one of the entries when the data requested is found in the one of the entries using two or more selection parameters, wherein the two or more selection parameters are used simultaneously in combination; and
    transmitting a forward snoop message to the source node to determine whether the source node stores a copy of the requested data,
    wherein the selection parameters prioritize which cache node is selected as the source node, and the source node has a highest priority amongst the cache node.

18. The method of claim 17 further comprising receiving a message that indicates the source node does not hold the requested data and selecting a second source node that has a next highest priority amongst the cache nodes.

19. The method of claim 17, wherein the selection parameters uses the topological layout of amongst the cache nodes and home node to prioritize the selection of the source node.

20. The method of claim 17, wherein the home node and cache nodes are located within different levels of memory.

* * * * *